Aug. 10, 1954 W. VAN GUILDER 2,686,072
HANDLE ATTACHMENT FOR COOKING UTENSILS
Filed March 6, 1950
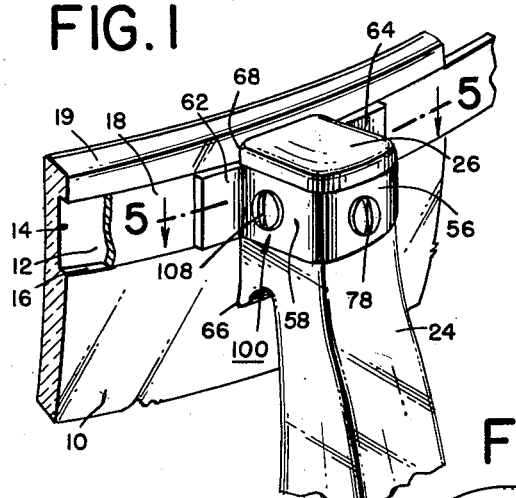
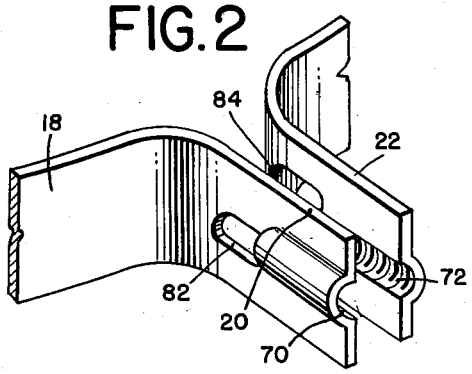
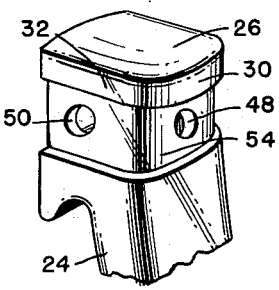
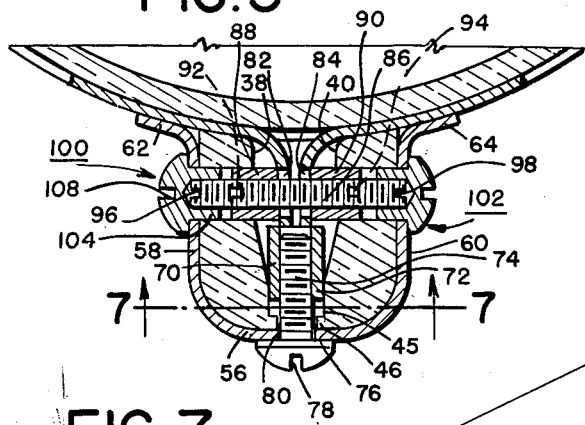
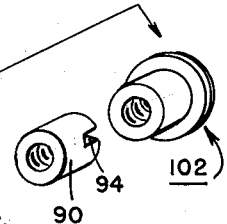
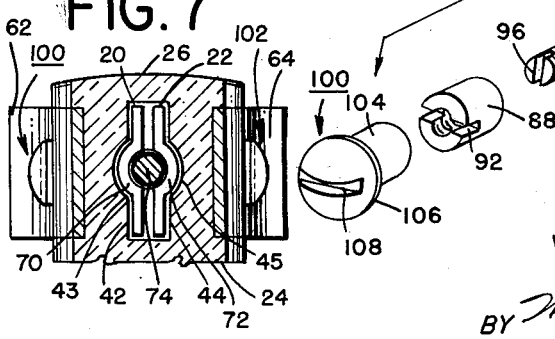
INVENTOR.-
WALTER VAN GUILDER
BY William C. Babcock
ATTORNEY Patented Aug. 10, 1954

2,686,072

UNITED STATES PATENT OFFICE 2,686,072

HANDLE ATTACHMENT FOR COOKING UTENSILS

Walter Van Guilder, River Forest, Ill., assignor to General Mills, Inc., a corporation of Delaware Application March 6, 1950, Serial No. 147,897

9 Claims. (Cl. 294—31.2)

The present invention relates to handle attachments for cooking utensils and particularly to an improved construction for an attachment of the type in which a clamping band circumferentially embraces the utensil and is provided with spaced radially projecting ends to which the handle is attached.

Various constructions have been proposed in the past for attachment of the handle member to the projecting ends of such a band. While some prior attachments provide a means of adjustment for tightening the band, such adjustments have either been relatively complicated and expensive in construction or have provided insufficient latitude of adjustment for accommodation of reasonable production variations in the dimensions of the bands and the cooking utensils with which they are used.

It is accordingly one object of the present invention to provide an improved handle attachment for cooking utensils.

Another object is the provision of a handle attachment incorporating improved adjusting means for alteration of the effective circumferential length of the band.

Still another object is the provision of a handle attachment of this type in which the band has circumferentially spaced, radially projecting ends attached to the handle, in combination with improved cooperating means on the projecting ends and handle for relative radial adjustment of the ends with respect to the handle.

A further object is the provision of improved means for relative adjustment of the circumferential spacing between such projecting band ends.

An additional object is the provision of means for relative radial adjustment of the projecting band ends with respect to the handle, in combination with means for relative circumferential adjustment of the spacing between said bands.

Another object is the provision of a handle attachment assembly which is relatively inexpensive, easy to produce, effective in operation, and neat in appearance.

Other objects and advantages will be apparent from the following specification in which a preferred embodiment of the invention has been described.

In the drawings forming a part of this application,

Figure 1 is a partial perspective view of a handle attachment according to the present invention, in assembled position on a cooking utensil.

Fig. 2 is a partial perspective view showing the radially projecting ends of the clamping band of the device of Fig. 1 with the handle removed.

Fig. 3 is a perspective view of the outer sides of the attachment portion of the handle.

Fig. 4 is a perspective view of the inner side of the attachment portion of the handle.

Fig. 5 is a sectional view on the line 5—5 of Fig. 1.

Fig. 6 is an exploded view showing details of certain of the adjusting members according to the invention, and Fig. 7 is a sectional view on the line 7—7 of Fig. 5.

As shown in Fig. 1 the handle attachment of the present invention is designed for use with a cooking utensil designated generally as 10. Typical of such cooking utensils are mixing bowls, glass cooking containers, glass coffeemaker parts and the like. Such cooking utensils are customarily provided with a circumferential or annular recess 12 providing upper and lower shoulders 14 and 16, respectively, to prevent relative vertical movement between the cooking utensil 10 and a circumferential clamping band 18 which is located in recess 12. The recess 12 and clamping band 18 are customarily located just below the upper rim 19 of the bowl and extend circumferentially around the bowl to completely encircle or embrace the same.

As shown in Fig. 2, the circumferential clamping band 18 has radially projecting ends 20 and 22 respectively. These ends are spaced or separated in a circumferential direction to facilitate subsequent tightening of the clamping band 18 by relative adjustment of such circumferential spacing.

A handle 24 is provided with a knob or attachment portion 26 at one end. The handle may be made of glass, plastic, or other desired material. In this particular illustration the handle 24 extends substantially vertically and the attachment portion 26 is at the upper end of the handle. It will be apparent from the following description that other orientations and arrangements of the handle and attachment portion can be made within the scope and spirit of the present invention.

The handle attachment portion 26 includes an inner face or side 28 (Fig. 4) which is normally held in abutting engagement against the outer surface of the cooking utensil or bowl 10. Inner side 28 of the attachment portion 26 thus lies in the circumferential plane of the band 18.

The attachment portion 26 also has an outer surface or side 30 which is substantially parallel to the inner surface 28 but which may be rounded smoothly where this outer side 30 joins the radially extending sides 32 and 34 of the attachment portion.

In order to accommodate the projecting ends 20 and 22 of the clamping band, the attachment portion 26 is provided at its inner face 28 with a radially extending recess 36. This recess 36 is bounded or defined at its sides by inner surfaces 38 and 40 (Figs. 4 and 5) which are substantially parallel to the planes of the projecting ends 20 and 22. At the inner end of recess 36 adjacent the cooking utensil 10, inner walls or surfaces 38 and 40 are circumferentially spaced a substantial distance apart in order to accommodate the projecting band ends 20 and 22 when the latter are similarly spaced. The walls 38 and 40 of the recess 36 converge toward each other as they extend radially outwardly of the handle attachment portion 26 as shown in Figs. 5 and 7. Thus at the outer end of the recess 36 the outer ends of surfaces 38 and 40 are relatively close together as indicated at 42 and 44 to engage the outer portions of band ends 20 and 22 and urge them toward each other. These outer wall portions 42 and 44 may be recessed outwardly as indicated at 43 and 45 to accommodate the threaded portions 70 and 72 of the band ends which are described below.

As shown in Fig. 5, the recess 36 does not extend all the way through to the outer surface 30 of the handle attachment portion 26. The recess terminates short of the outer surface to leave a partition wall indicated at 46 in Fig. 5 at the outer radial end of the recess. A radially extending opening or passage 48 is provided in this outer wall 46. The radial opening 48 is substantially centered at the end of the recess 36 and provides a passage through which a securing and adjusting member may project to fasten the handle to the projecting ends 20 and 22.

The handle attachment portion 26 is provided with aligned openings or passages 50 and 52 in the walls 32 and 34, respectively. These openings 50 and 52 extend in a substantially circumferential direction from the recess 36 to the respective sides of the handle attachment portion 26.

The outer sides 30, 32, and 34 of the handle attachment portion 26 have a circumferential recess or channel 54 which is at the same level as the channel 12 in the cooking utensil 10 and the internal recess 36 in the inner side 28 of the handle. In other words, the circumferential recess 54 of the handle attachment portion lies in substantially the same plane as that defined by the portion of band 18 circumferentially embracing the utensil 10. This recessed portion 54 is designed for accommodation of a combination reinforcing and trim strip 56. Portions 58 and 60 of the trim strip 56 fit within the portions of recess 54 at the faces 32 and 34 of the handle attachment portion, and the extreme ends 62 and 64 of the trim and reinforcing strip overlap slightly the portions of the circumferential clamping band 18 on either side of the handle.

The inner side 28 of the handle attachment portion 26 includes portions 66 and 68 which project a substantial distance below and above the utensil recess 12 to strengthen the attachment and prevent relative twisting of the handle with respect to the utensil.

The details of construction of the projecting ends 20 and 22 of the clamping band 18 are shown particularly in Fig. 2. Thus the outer ends of the radially projecting sections 20 and 22 are provided with internally threaded portions 70 and 72 designed for threaded engagement with the opposite sides of a suitable bolt or threaded member 74. This threaded member 74 has a head or shouldered portion 76 fitting outside the outer wall 30 and designed to clamp the reinforcing and trim strip 56 firmly in that portion of recess 54 located on the outer side of the handle attachment. The adjusting member 74 has a cross slot 78 in its outer face or head for adjustment of the extent to which bolt 74 is threaded into the threaded portions 70 and 72 of projecting ends 20 and 22. The threaded member 74 passes through an opening 80 in the reinforcing strip 56 and thus secures and locates the strip firmly in position.

As indicated above, the relative circumferential separation or spacing between the outer portions 42 and 44 of inner wall surfaces 38 and 40 is such that the threaded portions 70 and 72 will be clamped toward each other. These threaded portions are thus held in operative threaded engagement with the bolt or threaded adjusting member 74. Hence rotation of the adjusting member 74 on its axis will change the relative radial positions of the adjusting member 74 and band ends 20 and 22. Since inward movement of the adjusting member 74 is prevented by engagement of the head or shouldered portion 76 against the trip strip 56, a tightening movement of the member 74 will pull the projecting ends 20 and 22 radially outwardly away from the cooking utensil and will thus effectively tighten the clamping band 18 and hold the handle portion 26 firmly against the side wall of utensil 10. The amount of relative adjustment which can be obtained in this manner is limited by the radial thickness of the handle and the wall thicknesses necessary to obtain adequate strength of the parts.

Additional cooperating and adjusting means have been provided according to the present invention for further adjustment of the clamping band 18. For this purpose the projecting ends 20 and 22 are provided with opposed radially extending slots 82 and 84, respectively. These slots are located inwardly of the threaded portions 70 and 72 and are preferably relatively close to the portion of band 18 which is adapted to embrace the cooking utensil. These slots 82 and 84 are also located so that they will be in substantial alignment with the circumferentially extending openings 50 and 52 in the handle attachment portion 26. Thus a second screw means or threaded adjusting member 86 may be positioned in the circumferentially aligned openings and slots 50, 52, 82, and 84. The diameter of threaded adjusting member 86 is just slightly less than the vertical width of slots 82 and 84 and is substantially less than the diameter of openings 50 and 52 in order that annular internally threaded clamping members or nuts 88 and 90 may be threaded on the member 86 within openings 50 and 52. The outer diameter of these clamping nuts is just slightly less than the internal diameter of openings 50 and 52 in order that the clamping nuts 88 and 90 and the threaded adjusting member 86 may be definitely located and positioned axially of the openings, but may be free to rotate during adjustment.

Clamping nuts 88 and 90 are provided with cross slots 92 and 94, while the threaded member 86 has cross slots 96 and 98 at its ends. The various cross slots facilitate relative adjustment of the clamping nuts 88 and 90 on the member 86 when the parts are assembled.

As shown in Fig. 5, the clamping nuts 88 and 90 are threaded onto the member 86 until they engage the surfaces of projecting ends 20 and 22 at the vicinity of slots 82 and 84. Relative adjustment of the clamping nuts 88 and 90 toward each other will thus force the projecting ends 20 and 22 toward each other and will decrease the circumferential separation between them. This adjustment, in turn, will tighten the clamping band 18 on the cooking utensil 10.

In order to conceal the clamping or adjusting nuts 88 and 90 and prevent inadvertent changes in their setting, cap nuts 100 and 102 are provided for the ends of the threaded member 86. Thus cap nut 100 includes a cylindrical body portion 104 which is internally threaded to fit the outer end of threaded member 86. The outer diameter of cylindrical body portion 104 is designed to fit just within the inside diameter of opening 50. The cap nut 100 also includes a head or shouldered portion 106 and a cross slot 108 for screwing it in place. The head or shouldered portion 106 engages a corresponding portion of the reinforcing and trim strip 56 to hold it firmly in that portion of channel 54 on side 32 of the handle attachment portion 26. Similarly, the cap nut 102 closes the outer end of opening 52, conceals and protects the adjusting or clamping nut 90, and holds the trim strip 56 firmly in position in that portion of recess 54 located on side 34 of the handle attachment portion.

A construction has accordingly been provided which accomplishes the objects set forth at the beginning of this specification and which makes possible a much wider range or adjustment of the clamping band 18 than was possible in prior forms of handle attachments. For example, the two adjusting means exemplified by threaded members 74 and 86 make possible both relative radial adjustment and relative circumferential adjustment of the projecting ends 20 and 22 with respect to the handle.

Adjustment of threaded member 74 changes the relative radial position of the projecting ends 20 and 22 within the handle recess 36, while adjustment of the clamping nuts 88 and 90 on threaded adjusting member 86 changes the relative circumferential spacing or separation between these projecting ends. The radially extending slots 82 and 84 in the projecting ends 20 and 22 permit the desired radial movement of the ends under the action of adjusting member 74. Similarly, the tapered recess 36 and particularly the relatively broad circumferential spacing between inner surfaces 38 and 40 permits circumferential adjustment of the spacing between the projecting ends immediately adjacent the wall of the cooking utensil, while the substantially smaller spacing at the outer portions 42 and 44 of the inner surfaces of the recess holds the outer ends of the threaded portions 70 and 72 firmly in operative engagement with the threaded member 74 at all times.

The details of construction according to the present invention thus provide for independent adjustment of the relative positions of the projecting ends in the aforesaid radial and circumferential directions. This double adjustment provides a much wider range and permits the handle attachment of the present invention to accommodate itself to much greater variations in the production dimensions of the cooking utensil 10 and clamping band 18 than has been possible in prior art constructions.

Since minor variations and changes in the exact details of construction will be apparent to persons skilled in this field, it is intended that this invention shall cover all such changes and modifications as fall within the spirit and scope of the attached claims.

Now, therefore, I claim:

1. A band and handle attachment for cooking utensils wherein the band circumferentially embraces the utensil and is provided with circumferentially spaced, radially projecting ends, to which the handle is attached, means securing the handle and ends against undesired relative movement in a radial direction but permitting relative circumferential movement of the ends while said handle and ends remain fully secured, and adjustable means engaging the ends and varying the circumferential spacing between them, said adjustable means being externally accessible without removal of the handle from the utensil.

2. A band and handle attachment according to claim 1 in which the handle and projecting ends have aligned openings extending circumferentially adjacent the utensil, and in which said adjustable means includes a threaded member extending through said aligned openings, annular clamping nuts threaded on said member within the handle openings and engaging the projecting ends to limit their circumferential spacing, and cap nuts threaded on the outer ends of said member to close the handle openings and conceal the clamping nuts.

3. A band and handle attachment according to claim 2 in which the handle has a separate external trim strip substantially in the plane of the clamping band and overlapping the handle and adjacent portions of the band, the trim strip being held in position by said cap nuts.

4. A band and handle attachment for cooking utensils wherein the band circumferentially embraces the utensil and is provided with circumferentially spaced, radially projecting ends to which the handle is attached, the projecting ends having opposed radially extending slots and radially threaded portions located outwardly of the slots, first screw means extending radially of the handle and directly engaging said threaded portions of the band ends to secure the handle and ends in adjusted radial position, and second screw means extending circumferentially through said handle and slots and engaging said ends to secure them in adjusted circumferential position, said first and second screw means being selectively and independently adjustable while the handle is attached to the utensil.

5. A band and handle attachment for cooking utensils wherein the band circumferentially embraces the utensil and is provided with circumferentially spaced, radially projecting ends to which the handle is attached, the projecting ends having opposed radially extending slots adjacent the utensil and opposed radially threaded portions at their outer ends, the handle having a recess into which said ends project, a first opening extending radially outwardly from the recess in alignment with the threaded portions, and a second opening extending circumferentially through the handle in alignment with said opposed slots, first screw means passing through the radial opening and directly engaging the threaded portions of the band ends and securing the handle and ends in radially adjusted position, and second screw means passing through said circumferential opening and slots and having adjustable clamping portions engaging the ends to adjust the relative circumferential spacing between them, said first and second screw means being externally accessible and individually and selectively adjustable while the handle remains attached to the band and utensil.

6. A band and handle attachment according to claim 5 in which the handle recess has inner walls substantially spaced circumferentially adjacent the utensil and converging radially outwardly, the converging walls at their outer ends engaging the projecting band ends and maintaining the threaded portions in engagement with said first screw means.

7. A band and handle attachment for cooking utensils wherein the band circumferentially embraces the utensil and is provided with circumferentially spaced, radially projecting ends to which the handle is attached, the projecting ends having opposed radially threaded portions on their corresponding opposed surfaces adapted to engage opposite sides of a threaded member, and the handle having a recess adjacent the utensil bounded by inner surfaces which are substantially spaced in a circumferential direction adjacent the utensil and which converge as they extend radially outwardly, and a threaded adjusting member mounted in the handle and extending radially into the recess between the converging inner surfaces, said converging inner surfaces engaging the projecting band ends and maintaining the threaded portions in threaded engagement with said adjusting member.

8. A band and handle attachment for cooking utensils wherein the band circumferentially embraces the utensil and is provided with circumferentially spaced, radially projecting ends to which the handle is attached, the handle having a radial recess into which said ends project, an adjusting member on the handle extending radially inwardly into said recess, and separate adjustment means on the outer portions of each projecting end, each adjustment means engaging the adjusting member and thereby simultaneously drawing the ends radially into the recess in response to movement of the adjusting member, each adjustment means being radially disengaged from the adjusting member by relative movement of the end and adjusting member in a circumferential direction, the recess being bounded by inner walls which are substantially separated circumferentially adjacent the utensil to permit corresponding separation of the band ends at that point and which converge as they extend radially outwardly toward the adjusting member, said converging walls engaging the band ends and thereby holding the separate adjustment means of the outer portions of the projecting ends in engagement with said adjusting member.

9. A band and handle attachment according to claim 8 in which the handle has further adjusting means engaging the projecting ends adjacent the utensil for adjustment of their circumferential spacing to tighten the band selectively and independently of adjustment of the said adjusting member.

References Cited in the file of this patent

UNITED STATES PATENTS

| Number | Name | Date |
| --- | --- | --- |
| 1,977,364 | Wolcott | Oct. 16, 1934 |
| 2,422,510 | Ward | June 17, 1947 |
| 2,434,122 | Reichold | Jan. 6, 1948 |
| 2,554,644 | Serio | May 29, 1951 |

FOREIGN PATENTS

| Number | Country | Date |
| --- | --- | --- |
| 457,638 | France | Sept. 22, 1913 |
| 463,866 | France | Mar. 6, 1914 |